United States Patent
Katter

(10) Patent No.: US 9,175,885 B2
(45) Date of Patent: Nov. 3, 2015

(54) ARTICLE MADE OF A GRANULAR MAGNETOCALORICALLY ACTIVE MATERIAL FOR HEAT EXCHANGE

(75) Inventor: Matthias Katter, Alzenau (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 1094 days.

(21) Appl. No.: 12/523,199

(22) PCT Filed: Feb. 12, 2007

(86) PCT No.: PCT/IB2007/050451
§ 371 (c)(1),
(2), (4) Date: Jul. 15, 2009

(87) PCT Pub. No.: WO2008/099235
PCT Pub. Date: Aug. 21, 2008

(65) Prior Publication Data
US 2010/0037625 A1   Feb. 18, 2010

(51) Int. Cl.
*F25B 21/00* (2006.01)
*B32B 15/00* (2006.01)
*H01F 1/01* (2006.01)

(52) U.S. Cl.
CPC ............... *F25B 21/00* (2013.01); *H01F 1/015* (2013.01); *Y02B 30/66* (2013.01); *Y10T 156/00* (2015.01)

(58) Field of Classification Search
CPC ............ F25B 21/00; F25B 2321/002; F25B 2309/003; H01F 1/0557; H01F 1/0577; H01F 3/08; Y02B 30/66
USPC .................... 62/3.1; 428/692.1, 693.1
See application file for complete search history.

(56) References Cited

U.S. PATENT DOCUMENTS

| | | |
|---|---|---|
| 428,057 A | 5/1890 | Tesla |
| 4,322,257 A | 3/1982 | Menth et al. |
| 4,332,135 A | 6/1982 | Barclay et al. |
| 6,003,320 A | 12/1999 | Okamura et al. |
| 6,446,441 B1 | 9/2002 | Dean |
| 6,588,215 B1 | 7/2003 | Ghoshal |
| 6,676,772 B2 | 1/2004 | Saito et al. |
| 6,826,915 B2 | 12/2004 | Wada et al. |
| 7,063,754 B2 | 6/2006 | Fukamichi et al. |
| 7,076,959 B2 | 7/2006 | Lewis |
| 7,168,255 B2 | 1/2007 | Saito et al. |
| 7,186,303 B2 | 3/2007 | Kogure et al. |
| 7,553,562 B2* | 6/2009 | Otsuka .............. 428/692.1 |
| 7,622,202 B2* | 11/2009 | Maeda et al. ........ 428/692.1 |

(Continued)

FOREIGN PATENT DOCUMENTS

| | | |
|---|---|---|
| DE | 103 38 467 A1 | 3/2004 |
| DE | 10330574 | 6/2004 |

(Continued)

OTHER PUBLICATIONS

International Search Report and Written Opinion mailed Oct. 31, 2007 for International Application No. PCT/IB2007/050451.

(Continued)

*Primary Examiner* — Ljiljana Ciric
(74) *Attorney, Agent, or Firm* — Dickinson Wright PLLC

(57) ABSTRACT

Article for magnetic heat exchange having a mantle enveloping at least one core, wherein the core comprises a plurality of grains having a magnetocalorically active material.

18 Claims, 2 Drawing Sheets

(56) References Cited

U.S. PATENT DOCUMENTS

| | | | |
|---|---|---|---|
| 7,670,443 | B2 | 3/2010 | Kogure et al. |
| 7,695,574 | B2 | 4/2010 | Nakajima |
| 7,700,193 | B2 * | 4/2010 | Chen et al. ............ 428/693.1 |
| 7,914,628 | B2 | 3/2011 | Tsuji et al. |
| 8,061,147 | B2 * | 11/2011 | Dinesen et al. ............ 62/3.1 |
| 8,288,458 | B2 * | 10/2012 | Matsukawa et al. ...... 428/692.1 |
| 8,377,576 | B2 * | 2/2013 | Xiao et al. ............ 428/692.1 |
| 8,383,252 | B2 * | 2/2013 | Miwa et al. ............ 428/692.1 |
| 8,420,236 | B2 * | 4/2013 | Hosono et al. ............ 428/693.1 |
| 8,823,478 | B2 * | 9/2014 | Tanaka et al. ............ 428/692.1 |
| 8,840,800 | B2 * | 9/2014 | Suetsuna et al. ............ 428/693.1 |
| 2003/0044301 | A1 | 3/2003 | Lefebvre |
| 2004/0013593 | A1 | 1/2004 | Tagagimi |
| 2004/0079446 | A1 | 4/2004 | Kogure et al. |
| 2004/0093877 | A1 | 5/2004 | Wada et al. |
| 2004/0182086 | A1 | 9/2004 | Chiang et al. |
| 2004/0194855 | A1 | 10/2004 | Fukamichi et al. |
| 2004/0231338 | A1 | 11/2004 | Saito et al. |
| 2004/0261420 | A1 | 12/2004 | Lewis |
| 2005/0172643 | A1 | 8/2005 | Lewis |
| 2005/0241134 | A1 | 11/2005 | Lu |
| 2006/0005898 | A1 | 1/2006 | Liu et al. |
| 2006/0076084 | A1 | 4/2006 | Nakajima |
| 2006/0213580 | A1 | 9/2006 | Tsuji et al. |
| 2006/0218936 | A1 | 10/2006 | Kobayashi et al. |
| 2006/0231163 | A1 | 10/2006 | Hirosawa et al. |
| 2007/0137732 | A1 | 6/2007 | Kogure et al. |
| 2007/0218319 | A1 | 9/2007 | Ohkoshi et al. |
| 2008/0078184 | A1 | 4/2008 | Saito et al. |
| 2008/0078476 | A1 | 4/2008 | Saito et al. |
| 2010/0047527 | A1 | 2/2010 | Katter |
| 2010/0116471 | A1 | 5/2010 | Reppel et al. |
| 2011/0048690 | A1 | 3/2011 | Reppel et al. |
| 2011/0140031 | A1 | 6/2011 | Katter et al. |
| 2011/0151230 | A1 | 6/2011 | Katter |
| 2011/0168363 | A9 | 7/2011 | Reppel et al. |
| 2011/0198069 | A1 | 8/2011 | Katter et al. |

FOREIGN PATENT DOCUMENTS

| | | |
|---|---|---|
| DE | 10 2006 015 370 A1 | 10/2006 |
| DE | 112007003401 | 1/2010 |
| EP | 0 187 538 A2 | 7/1986 |
| EP | 0 217 347 B1 | 2/1993 |
| EP | 1 867 744 A1 | 12/2007 |
| GB | 2 424 901 A | 10/2006 |
| GB | 2 458 039 A | 9/2009 |
| GB | 2 459 066 A | 10/2009 |
| GB | 2 460 774 A | 12/2009 |
| JP | 01-140701 | 6/1989 |
| JP | 4-338604 A | 11/1992 |
| JP | 4-338605 A | 11/1992 |
| JP | 5-30135 | 4/1993 |
| JP | 07-019790 | 1/1995 |
| JP | 7-320918 A | 12/1995 |
| JP | 10-185339 | 7/1998 |
| JP | 2000-54086 | 2/2000 |
| JP | 2000-274976 A | 10/2000 |
| JP | 2002-69596 | 3/2002 |
| JP | 2002-356748 A | 12/2002 |
| JP | 2003-240384 | 8/2003 |
| JP | 2005-015911 | 1/2005 |
| JP | 2005-036302 A | 2/2005 |
| JP | 2005-93729 | 4/2005 |
| JP | 2005-120391 A | 5/2005 |
| JP | 2006-89839 A | 4/2006 |
| JP | 2006-283074 A | 10/2006 |
| JP | 2007-031831 A | 2/2007 |
| JP | 2007-084897 A | 4/2007 |
| JP | 2007-515616 | 6/2007 |
| JP | 2007-281410 A | 10/2007 |
| JP | 2009-249702 A | 10/2009 |
| WO | WO 93/25857 | 12/1993 |
| WO | WO 00/45397 A1 | 8/2000 |
| WO | WO 2005/064245 A2 | 7/2005 |
| WO | WO 2005/066980 A2 | 7/2005 |
| WO | WO 2006/074790 A1 | 7/2006 |
| WO | WO 2008/099234 A9 | 8/2008 |
| WO | WO 2008/099235 A1 | 8/2008 |
| WO | WO 2009/090442 A1 | 7/2009 |
| WO | WO 2010/038098 A1 | 4/2010 |
| WO | WO 2010/128357 A1 | 11/2010 |

OTHER PUBLICATIONS

Barrett, C.S., "Crystal Structure of Metals," *ASM Handbook*, Formerly Ninth Edition, Metals Handbook, vol. 9, ASM International, Materials Park, OH (1985), pp. 8-9.

Bulanova, M. V. et al., "Lanthanum-silicon System," *Journal of Alloys and Compounds* 329 (2001) (pp. 214-223).

Chang, H. et al., "Theoretical Study of Phase Forming of $NaZn_{13}$—type Rare-Earth Intermetallics," *J. Phys.: Condens. Matter*, vol. 15 (2003) pp. 109-120 XP002385787.

Fujieda, S. et al., "Enhancement of Magnetocaloric Effects in $La_{1-z}Pr_z(Fe_{0.88}Si_{0.12})_{13}$ and their Hydrides," *Journal of Applied Physics* 102, 023907 (2007) American Institute of Physics (5 pages).

Fujieda, S. et al., "Giant Isotropic Magnetostriction of Itinerant-Electron Metamagnetic $La(Fe_{0.88}Si_{0.12})_{13}H_y$ Compounds," *Applied Physics Letters*, vol. 79, No. 5, Jul. 30, 2001, pp. 653-655.

Fujieda, S. et al., "Large Magnetocaloric Effect in $La(Fe_xSi_{1-x})_{13}$ Itinerant-Electron Metamagnetic Compounds," *Applied Physics Letters*, vol. 81, No. 7, Aug. 12, 2002, American Institute of Physics (2002) pp. 1276-1278.

Fujieda, S. et al., "Strong Magnetocaloric Effects in $La_{1-z}Ce_z(Fe_{x-y}Mn_ySi_{1-x})_{13}$ at Low Temperatures," *Applied Physics Letters*, vol. 89, 062504 (2006) American Institute of Physics (3 pages).

Fujita, A. et al., "Control of Large Magnetocaloric Effects in Metamagnetic $La(Fe_xSi_{1-x})_{13}$ Compounds by Hydrogenation," *Journal of Alloys and Compounds* 404-406 (2005) pp. 554-558, Elsevier B.V. (5 pages).

Fujita, A. et al., "Giant Magnetovolume and Magentocaloric Effects in Itinerant-Electron Metamagnetic $La(Fe_xSi_{1-x})_{13}$ Compounds," *Materia Japan*, vol. 41, No. 4, Apr. 20, 2002, pp. 269-275.

Fujita, A. et al., "Giant Volume Magnetostriction Due to the Itinerant Electron Metamagnetic Transition in $La(Fe—Si)_{13}$ Compounds," Department of Materials Science, Graduate School of Engineering, IEEE Transactions on Magnetics, vol. 35, No. 5, Sep. 1999 (pp. 3796-3798).

Hu, F. X. et al., "Magnetic Entropy Change in La $(Fe_{0.98}Co_{0.02})_{11.7}Al_{1.3}$," *J. Phys.: Condens. Matter*, vol. 12 (2000) L691-696.

Hu, F. X. et al., "Magnetic Entropy Change and its Temperature Variation in Compounds $La(Fe_{1-x}Co_x)_{11.2}Si_{1.8}$," *Journal of Applied Physics*, vol. 92, No. 7, Oct. 1, 2002, American Institute of Physics (2002) pp. 3620-3623.

Ji, J. F. et al., "A Novel Technique for Manufacturing Metal-bonded Nd—Fe—B Magnets by Squeeze Casting," *Metallurgical and Materials Transactions A* (Physical Metallurgy and Material Science) ISSN 1073-5623, 2002, vol. 33, No. 3, pp. 637-646 (10p.) and Abstract of the same.

Katter, M. et al., "Magnetocaloric Properties of $La(Fe, Co, Si)_{13}$ Bulk Material Prepared by Powder Metallurgy," Vacuumschmelze GmbH and Company KG, *IEEE Transactions on Magnetics*, vol. 44, No. 11, Nov. 2008 (pp. 3044-3047).

Kneller, E., "Ferromagnetismus," Springer-Verlag, 1962 (1 page).

Mandal, K. et al., "Magnetocaloric Effect in Reactively-Milled $LaFe_{11.57}Si_{1.43}H_y$ Intermetallic Compounds," *Journal of Applied Physics* 102, 053906 (2007) American Institute of Physics (5 pages).

Massalski, Th.B., "Diagram 1074," Binary Alloy Phase Diagrams, Ed. J.L. Murray, L.H. Benett, H. Backer, American Society of Metals Ohio, (1986) 1074.

Massalski, Th.B., "Diagram 1108," Binary Alloy Phase Diagrams, Ed. J.L. Murray, L.H. Benett, H. Backer, American Society of Metals Ohio, (1986) 1108.

Otani, Y. et al., "Metal Bonded $Sm_2Fe_{17}N_{3-\delta}$ magnets," Department of Pure and Applied Physics, Trinity College, Dublin 2, Ireland, *J. Appl. Phys.* 69 (9), May 1, 1991, 1991 American Institute of Physics, pp. 6735-6737.

(56) References Cited

OTHER PUBLICATIONS

Richard, M.A. et al., "Magnetic Refrigeration: Single and Multimaterial active Magnetic Regenerator Experiments," *Journal of Applied Physics*, vol. 95, No. 4, Feb. 15, 2004, pp. 2146-2150, American Institute of Physics (6 pages).

Saito, A. T. et al., "Magnetocaloric Effect of New Spherical Magnetic Refrigerant Particles of $La(Fe_{1-x-y}Co_xSi_y)_{13}$ Compounds," *ScienceDirect, Journal of Magnetism and Magnetic Materials* 310 (2007) 2808-2810, www.sciencedirect.com (pp. 2808-2810).

Tishin, A.M. et al., "The Magnetocaloric Effect and its Applications," Institute of Physics Publishing, Bristol and Philadelphia, IOP Publishing Ltd. 2003, pp. 371-375.

Villars, P. et al., "Diagram 10375," *Handbook of Ternary Alloy Phase Diagrams*, $2^{nd}$ Ed., ASM International, 10 (1997) 10375 (1 page).

Villars, P. et al., "Diagram 8502," *Handbook of Ternary Alloy Phase Diagrams*, $2^{nd}$, ASM International, 7 (1997) 8502 (1 page).

Wang, J. et al., "The Hydrogenation Behavior of $LaFe_{11.44}Si_{1.56}$ Magnetic Refrigerating Alloy," *Journal of Alloys and Compounds*, vol. 485 (2009) pp. 313-315, Elsevier B.V. (3 pages).

Zhang, H. at al., "The Spike in the Relation Between Entropy Change and Temperature in $LaFe_{11.83}Si_{1.17}$ Compound," ScienceDirect, *Journal of Magnetism and Magnetic Materials* 320 (2008) 1879-1883, www.sciencedirect.com (pp. 1879-1883).

Zhang, X. X. et al., "Magnetic Entropy Change in Fe-based Compound $LaFe_{10.6}Si_{2.4}$," Applied Physics Letters, vol. 77, No. 19, Nov. 16, 2000, pp. 3072-3074 (2000) American Institute of Physics.

Zimm, C. et al., "Description and Performance of a Near-Room Temperature Magnetic Refrigerator," *Advances in Cryogenic Engineering*, vol. 43, Plenum Press, New York, (1998) pp. 1759-1766.

\* cited by examiner

ARTICLE MADE OF A GRANULAR MAGNETOCALORICALLY ACTIVE MATERIAL FOR HEAT EXCHANGE

BACKGROUND

1. Field

Described here is an article for magnetic heat exchange and methods of manufacturing it.

2. Description of Related Art

The magnetocaloric effect describes the adiabatic conversion of a magnetically induced entropy change to the evolution or absorption of heat. Therefore, by applying a magnetic field to a magnetocaloric material, an entropy change can be induced which results in the evolution or absorption of heat. This effect can be harnessed to provide refrigeration and/or heating.

Magnetic heat exchange technology has the advantage that magnetic heat exchangers are, in principle, more energy efficient than gas compression/expansion cycle systems. Furthermore, magnetic heat exchangers are environmentally friendly, as ozone depleting chemicals such as CFC's are not used.

Magnetic heat exchangers, such as that disclosed in U.S. Pat. No. 6,676,772, typically include a pumped recirculation system, a heat exchange medium such as a fluid coolant, a chamber packed with particles of a magnetic refrigerant working material which displays the magnetocaloric effect, and a means for applying a magnetic field to the chamber.

In recent years, materials, such as $La(Fe_{1-a}Si_a)_{13}$, $Gd_5(Si,Ge)_4$, $Mn(As,Sb)$ and $MnFe(P,As)$ have been developed which have a Curie Temperature, $T_c$, at or near room temperature. The Curie Temperature translates to the operating temperature of the material in a magnetic heat exchange system. Consequently, these materials are suitable for use in applications such as building climate control, domestic and industrial refrigerators and freezers, and automotive climate control.

Further developments of these materials have been directed towards optimizing the composition so as to increase the entropy change and to increase the temperature range over which the entropy change occurs. This enables smaller applied magnetic fields to be used to achieve sufficient cooling and a stable refrigeration cycle to be achieved over a larger temperature range. These measures aim to simplify the design of the heat exchange system as the smaller magnetic fields can be produced by a permanent magnet rather than requiring an electromagnet or even a superconducting magnet. However, further improvements are desirable to enable a more extensive application of magnetic heat exchange technology.

SUMMARY

Disclosed herein are embodiments of an article for a magnetic heat exchange system which can be reliably and cost-effectively produced and which can be produced in a form suitable for use in magnetic refrigeration systems.

Also disclosed herein are embodiments of methods by which the article may be produced.

In one embodiment disclosed here is an article comprising a mantle which envelops at least one core. In a particular embodiment, the core comprises a plurality of grains comprising a magnetocalorically active material.

In another particular embodiment disclosed herein, the core comprises a precursor of a magnetocalorically active material in amounts to provide the stoichiometry of the magnetocalorically active material.

In another embodiment is disclosed a heat exchanger, a refrigeration system, a climate control device, an air conditioning unit, or an industrial, commercial, or domestic freezer having an article disclosed herein.

In another embodiment is disclosed a laminated article comprising a plurality of articles described herein laminated together. In a particular embodiment, this laminated article includes at least one spacer disposed between two adjacent articles.

In another embodiment is a heat exchanger, a refrigeration system, a climate control device, an air conditioning unit, or an industrial, commercial, or domestic freezer containing a laminated article as disclosed herein.

In another embodiment is disclosed a method for providing a powder comprising a magnetocalorically active material or precursor thereof, providing a mantle, and enveloping the powder in the mantle to form a composite article.

In another embodiment is disclosed a method to fabricate a laminated article, comprising arranging two or more articles as described herein and laminating to form a laminated article.

BRIEF DESCRIPTION OF DRAWINGS

Embodiments of the method and apparatus disclosed herein will now be described with reference to the following non-limiting drawings.

DETAILED DESCRIPTION OF SPECIFIC EMBODIMENTS

Figure 1:
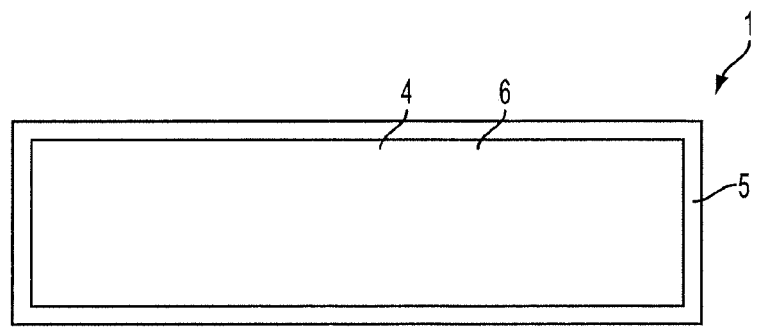
FIG. 1 is a schematic diagram of a step in the manufacture of a particular embodiment of a fin for a heat exchanger in which powder of a magnetocalorically active material is enveloped in a metal mantle to form a composite article, shown in a side sectional view.

A magnetocalorically active material is defined herein as a material which undergoes a change in entropy when it is subjected to a magnetic field.

The entropy change may be the result of a change from ferromagnetic to paramagnetic behaviour, for example. The magnetocalorically active material may exhibit in only a part of a temperature region an inflection point at which the sign of the second derivative of magnetization with respect to an applied magnetic field changes from positive to negative.

In a particular embodiment, magnetocalorically active material is enclosed within a mantle which provides an outer cladding have a certain thickness which surrounds the core comprising, the magnetocalorically active material. The resulting article has a layered or laminate type structure rather than a non-magnetocalorically active matrix with isolated grains or particles of magnetocalorically active material embedded in the matrix. The grains or particles of the core may be contiguous with their neighbours. The article desirably has an aspect ratio of more than 1.2.

The structure disclosed in this embodiment has the advantage that the problems associated with the use of particles as the magnetic working material in a magnetic heat exchange system are avoided, because the particulate matter, whether in the from of grains or particles, is enclosed within the mantle. Consequently, the particles of the magnetocalorically active material are protected from direct contact with the cooling medium or heat transfer fluid.

This has the advantage that the particles or grains are not buffeted by the movement of the fluid and are, therefore, not crushed. Crushing can result in the production of a fine powder which may clog other parts of the heat exchange system, such as the pump. Additionally, the mantle provides protection against possible corrosion caused by a direct contact of the cooling medium with the magnetocalorically active material. This protection means that an additional coating of the individual particles with protective layers can be avoided. As a result of the structure of the article described herein, operating life of the working material is increased, which further increases the ease of use and cost effectiveness of the magnetic heat exchange system Additionally, as a result of the structure described herein, article comprising the mantle and at least one core has mechanical integrity. This has the advantage that the design of the heat exchange system is simplified in that a container to hold the magnetocalorically active material is not required. Furthermore, the article can easily and accurately be produced in a variety of forms such as foils, plates, or larger bodies depending on the design of the refrigeration or heat exchange system. The restrictions on the size of material which is produced by melt casting methods, and in particular, melt spinning are, therefore, avoided as are the problem, associated with accommodating powder or particulate matter in an additional container.

The article may be a component of a heat exchanger, a cooling system, an air conditioning unit for a building or a vehicle, in particular an automobile, or a climate control device for a building or an automobile. The climate control device may be used as a heater in winter and as a cooler in summer by reversing the direction of the fluid coolant or heat exchanger medium. This is particularly advantageous for automobiles and other vehicles as the space available within the chassis for accommodating the climate control system is limited by the design of the vehicle.

Also disclosed herein is an embodiment of an article in which the core comprises a plurality of particles comprising a precursor of a magnetocalorically active material in an amount to provide the stoichiometry of the magnetocalorically active material. This article may be considered an intermediate product with respect to the article disclosed above.

This embodiment of article may be later subjected to a heat treatment under conditions suitable to cause a chemical reaction of the precursor which forms one or more magnetocalorically active phases within the mantle. Such a heat treatment provides a reactive sintering of the core.

The precursor may comprise a mixture of particles, each having one of a number of different compositions. The precursor may comprise a plurality of particles each comprising a single chemical element or a binary or ternary alloy.

The stoichiometry of the precursor powders may be selected and adjusted to provide the desired phase or phases after a reactive sintering heat treatment depending on the composition of the individual constituents of the precursor.

In an embodiment, the magnetocalorically active material has a Curie temperature in the range 220K to 345K. The operating temperature of the magnetocalorically active material, when used in a magnetic heat exchange system, is approximately that of its Curie temperature. A magnetocalorically active material with a Curie temperature in the range 220K to 345K is suitable for applications such as domestic and commercial freezer systems, refrigeration, air conditioning, or climate control systems, depending on the desired operating temperature and operating temperature range.

In a particular embodiment, the magnetocalorically active material can be one of Gd, a $La(Fe_{1-b}Si_b)_{13}$-based phase, a $Gd_5(Si, Ge)_4$-based phase, a $Mn(As, Sb)$-based phase, a $MnFe(P, As)$-based phase, a Tb—Gd-based phase, a $(Pr, Nd, Sr)MnO_3$-based phase or a $Pr_2(Fe, Co)_{17}$-based phase. These basic compositions may further comprise additional chemical elements which may substitute partially or in full for the listed elements. These phases may also comprise elements which are accommodated at least in part interstitially within their crystal structure. These phases may also include impurity elements and small amounts of elements such as oxygen.

The mantle surrounds the core and may comprise a material selected to provide a number of desired properties to the article. The mantle may provide mechanical strengthening of the article. This is particularly useful for the embodiment in which the core comprises a precursor of the magnetocalorically active material which has not yet been reacted to form the desired magneto-caloric phase. The mantle allows such an article to be more simply transported and worked before the reaction sintering process is carried out.

In a particular embodiment, the article may comprise a plurality of cores which may be embedded in a matrix and enveloped by the mantle. The matrix and the mantle may comprise the same or different materials.

In a particular embodiment, the mantel may comprise two or more layers which may each have different properties. For example, an outer mantle may provide corrosion resistance and an inner mantle may provide increased mechanical strength. In another particular embodiment, the mantle may also be chosen to have a high thermal conductivity so as to increase heat transfer from the core to the heat transfer medium in which the article is situated in a heat exchanger.

In a particular embodiment, the mantle may comprise a material with a melting point of greater than 1100° C. so as to enable a reactive sintering process of the core to occur at temperatures up to just below the melting point of the mantle.

As exemplary materials, the mantle may comprise iron or iron-silicon or nickel or steel or stainless steel. Stainless steel has the advantage that it has better corrosion resistance. Iron has the advantage that it is cheaper.

In the embodiment where magnetocalorically active material is packed into the mantle and, particularly in the case where no heat treatment is carried out on the article, the melting temperature of the material of the mantle may be lower than 1100° C. Furthermore, undesirable chemical reactions between the mantle and the core are avoided if the article is not heated. This increases the number of suitable materials for the mantle for this embodiment.

The material of the mantle can be chosen so as to provide a good thermal conductivity. This increases the efficiency of the thermal transfer between the article and the heat exchange medium of cooling fluid. The mantle may comprise copper or a copper-based alloy or aluminium or an aluminium-based alloy, for example.

In an embodiment where a precursor of the magnetocalorically active material is packed in the mantle before the reaction to form the magnetocalorically active phase or phases, the material of the mantel may be chosen so as to partially react with the core to produce the desired phase. For example, an iron-silicon alloy may be selected and positioned adjacent the core or part of the mantle to enable a reaction to occur between the core and the iron-silicon. The composition of the precursor of the core may be adjusted accordingly so that the final reactive sintered material of the core has the desired composition.

In a particular embodiment, the mantle and matrix, if one is provided, may be plastically deformable. This enables conventional powder-in-tube based processing methods to be used to fabricate the article. The article may be provided in a variety of forms such as a tape or a wire or a plate, and may be elongate. The article may also be flexible, which enables the article to be formed into a variety of coils and laminates by simple mechanical processes such as winding and bending.

In a particular embodiment, single elongate article can be formed in which the mantle envelops all sides of the core. This article can be formed into a desired shape, e.g., wound in the form of a solenoid or a pancake type coil so that the article has a form appropriate for a particular application, desirably without the article having to be cut. Cutting the article has the disadvantage that the core is exposed, and is not covered by the mantle in the cut edge. This exposed region may corrode or decompose, depending on the stability of the core and the environment to which it is subjected. If a portion of the core is exposed (e.g., by cutting) and it is desired to protect it, a further outer protective layer may be provided. This layer may be provided in only the regions of the exposed core or the whole mantle may be coated and sealed by an additional protective layer. The process of forming the article into the desired shape may take place before or after the reactive sintering process.

In a particular embodiment, a plurality of articles each comprising at least one core comprising a magnetocalorically active material, or precursor thereof, may be assembled to provide an article for magnetic heat exchange. Each article may have a different $T_c$, or an overall composition which after reactive sintering to form the magnetocalorically active phase, results in a different $T_c$. This has the advantage of increasing the operating range of the heat exchanger in which the articles are used since the $T_c$ translates to the operating temperature. A plurality of pancake coils, each comprising a tape including a magnetocalorically active phase having a different $T_c$, may be arranged in a stack, for example.

In a particular embodiment, the article may also comprise one or more channels in a surface thereof which channels are adapted to direct the flow of a heat exchange medium with respect to the article. These channels are positioned in the surface of the mantle and may be simply produced by plastic deformation of the surface, such as pressing or rolling. Alternatively, the channel or channels may be produced by removing material, for example by cutting or milling.

As indicated above, channel or channels may be adapted to direct the flow of a heat exchange medium. This may be achieved by selecting both the width and depth of the channel, as well as its form and position in the surface of the article.

The channel or channels can increase the contact area between the article and the coolant so as to increase the efficiency of the heat transfer. Furthermore, the channel may be adapted so as to reduced the formation of eddys in the fluid coolant or heat exchange medium and reduce the flow resistance of the coolant so as to improve heat transfer efficiency. In an embodiment, a plurality of generally parallel channels are provided in at least one surface of the article.

In an embodiment wherein a precursor of a magnetocalorically active material is enveloped in the mantel, the channel or channels may be introduced into the surface before or after any reactive sintering process.

Also described herein is a heat exchanger comprising an article according to one of the embodiments described above.

Also described herein is a laminated article comprising two or more articles, each comprising a mantle and at least one core, according to one of the embodiments previously described. A laminated structure enables larger components to be assembled from more easily fabricated single articles. The core of the articles of the laminate may comprise magnetocalorically active material or a precursor thereof as previously described.

In an embodiment, the laminated article further comprises at least one spacer which is positioned between adjacent articles. If the laminated article comprises n articles, it may comprise n−1 spacers so that each inner article of the laminated structure is separated from its neighbours by a spacer. Alternatively, the laminated article may comprise n+1 spacers so that a spacer is positioned adjacent each side of an article.

The spacer provides the laminated article with an open structure so that the heat exchange medium or coolant may flow between layers of the laminated article. This increases the cross-sectional area of the laminated article and increases the heat transfer from the laminated article to the heat exchange medium.

The spacer may be provided in a variety of forms. In an embodiment, the spacer is an integral part of the article and may be provided by one or more protruding regions of a surface of an article. These protruding regions may be provided by providing one or more depressions in the surface of the article thus creating protrusions in the surface between the depression. In an embodiment, the protruding regions are provided by a plurality of grooves in the surface of the article. The grooves may be generally parallel to one another.

In an embodiment, the spacer is provided as an additional element which is positioned between adjacent layers of the laminate stack. The additional element may be provided by a former. In a further embodiment the spacer is a corrugated tape. The corrugated tape may be positioned between generally flat articles to form a structure similar to that commonly associated with corrugated cardboard.

In a particular embodiment, the spacer may comprise an article comprising a mantle and a magnetocalorically active core or precursor thereof according to one of the embodiments previously described. This increases the volume of the laminated article which comprises a magnetocalorically active material and increases the efficiency of the heat exchange system.

If a corrugated tape is provided as a spacer, this can conveniently be produced by corrugating portions of the tape, or further tapes which are generally similar to the tape, provided as the flat members of the laminated article.

In a particular embodiment the additional spacer member may provide or be adapted to provide one or more channels adapted to direct the flow of a heat exchange medium. This advantageously increases the heat transfer efficiency.

In a particular embodiment, a plurality of channels which are generally parallel to one another may be provided in one or more surfaces of the article or as a result of the form of the additional spacer. In an embodiment the channels of neighbouring layers in the laminate are arranged so that they are orthogonal to one another. This provides a cross-type flow for the heat exchange medium which increases the efficiency of the heat exchanger.

In another embodiment, the laminated article may be a component of a heat exchanger, a refrigeration system, a climate control device, an air conditioning unit, or an industrial, commercial or domestic freezer.

In another embodiment is described a heat exchanger comprising at least one laminated article according to an embodiment previously described.

In another embodiment is provided a method of manufacturing a magnetocalorically active composite article comprising:
providing powder of a magnetocalorically active material or precursor thereof;
providing a mantle,
enveloping the precursor powder in the mantle to form a composite article,
optionally, converting precursor of magnetocalorically active material to said magnetocalorically active material The powder which is enveloped in the mantle may be compacted to form a compact or may have the form of a loose powder. This compact may be formed separately from the mantle or may be formed by compacting powder layer by layer in the mantle.

The mantle may be provided in a variety of forms. For example, mantle may be a tube or may be provided as a generally flat envelope which is open on at least one side or as two plates or foils. The mantle may comprise a metal or an alloy.

After the powder is enveloped in the mantle, the mantle may be sealed. This may be achieved for example, by welding the seams or by plugging the ends of a tube possibly with an additional welding step to join the plugs and tube. The composite article may be subjected to a degassing heat treatment before the mantle is sealed so as to remove undesired water, hydrogen and oxygen, for example.

The composite article my then be used in a heat exchange system.

In a further embodiment of the method, the composite article can be subjected to a mechanical deformation process. The mechanical deformation process increases the size of the composite article as well as increasing the density of the core. It is desirable that the mechanically deformed composite article has a high fill factor of the powder which provides the magnetocalorically active component so as to provide greater cooling capacity for a composite article of a given size. The composite article may be mechanically deformed by one or more conventional processes such as rolling, swaging and drawing.

In a particular embodiment, a multistage stage deformation annealing process may also be carried out. One or more intermediate annealing heat treatments may also be carried out during the mechanical deformation process or processes in order to soften the mantle and, depending on the relative hardnesses and annealing behaviour of the powder in relation to the mantle, to soften the powder as well. The annealing heat treatment simply softens the metals and/or alloys and substantially no chemical reaction to form the magnetocalorically active phase takes place during these annealing heat treatments. An annealing heat treatment is typically carried out at around 50% of the melting temperature of the material.

In an embodiment where the magnetocalorically active powder has been packed into the mantle, the article may be used in the as-mechanically deformed or as-annealed state in a heat exchange system In a particular embodiment, after the powder has been packed into the mantle and subjected to one or more mechanical deformation processes, if desired, the composite article may be subjected to a heat treatment. In the case of a core comprising magnetocalorically active material, a heat treatment may be used to improve the properties of the magnetocalorically active material. If a precursor of the magnetocalorically active phase is enveloped in the mantle, then the heat treatment is used to form the magnetocalorically active phase from the precursor. The heat treatment conditions, therefore, depend on the material, as well as the type of precursor. This heat treatment of the precursor powder is referred to as reactive sintering.

In a particular embodiment wherein precursor powder is enveloped in the mantle, the composite article may undergo a first mechanical deformation process or processes, undergo a first reactive sintering heat treatment partially reacting the powder, undergo a second mechanical deformation process and then undergo a second reactive sintering heat treatment. In principle, any number of reactive sintering and mechanical deformation processes can be carried out in e.g., an alternating fashion as described above.

In a particular embodiment, at least one channel may be introduced into a surface of the composite article. The one or more channels may be introduced by plastic deformation of at least one surface of the composite article. This may be achieved by profile rolling, for example, or by removing material of the mantle by milling for example. In an embodiment, a plurality of grooves are introduced into a surface. Each groove is separated from its adjacent groove by a ridge. The grooves and ridges may be generally parallel to one another.

In a particular embodiment, the channel may be introduced into a surface of the composite article before the sintering process is carried out.

Also described herein are methods of manufacturing a laminated article from two or more articles according to an embodiment previously described.

A laminated article may be formed by arranging two or more composite articles to form a laminate which may have the form of a stack. The articles may be joined together to form a single fixed laminated article. This may be performed by welding or, depending on the subsequent treatments to which the laminate will be subjected, a lower temperature joining technique such as brazing or soldering.

The laminated article may be manufactured in a form suitable for use as the active component in e.g., a heat exchanger or climate control apparatus for example. This active component may have the form of a fin, for example.

In some embodiments, at least one spacer is provided between adjacent articles of the laminated structure. In a first embodiment, the spacer is provided by the channel or channels provided in one or more surfaces of the individual articles. As previously described, the channels may be introduced by profile rolling, pressing, spark cutting or milling. The channels allow the heat exchange medium to flow through the laminated article, thus improving the contact area between the heat exchange medium and the laminated article and improving the heat transfer characteristics.

In an embodiment, the spacer is provided in the form of an additional member which is positioned between adjoining layers of the laminate. The spacer may be provided in the form of spacer blocks or as spokes of a former or in the form of a corrugated tape, for example. A corrugated tape may be fabricated by rolling flat tape between two meshed cogs which have a suitable spacing between the teeth of the two cogs as they mesh. The spacer may itself comprise magnetocalorically active material and may itself be an article according to one of the embodiments previously described.

In a particular embodiment, the channels of the laminated article may be arranged so as to direct the flow of the heat exchange medium so as to maximise heat transfer while reducing the currents. In an embodiment, each layer of the laminate comprises an article in which one surface comprises a plurality of generally parallel grooves. In a particular embodiment, the generally parallel grooves of neighbouring layers in the laminate are arranged generally orthogonal to one another. If an additional spacer is used, the spacer positioned between neighbouring layers may also provide channels arranged generally orthogonal to one another.

In embodiments wherein a precursor or precursors of the magnetocalorically active phase are enveloped in the mantle, the laminated article may be assembled before or after a heat treatment process is carried out to form one or more magnetocalorically active phases in the core.

The laminated article may also be assembled from partially reacted composite articles and the laminate subjected to a final reactive sintering treatment after the articles have been assembly and possibly joined together to form the laminated article. The laminated article may be subjected to pressure during the reactive sintering treatment.

Figure 2:
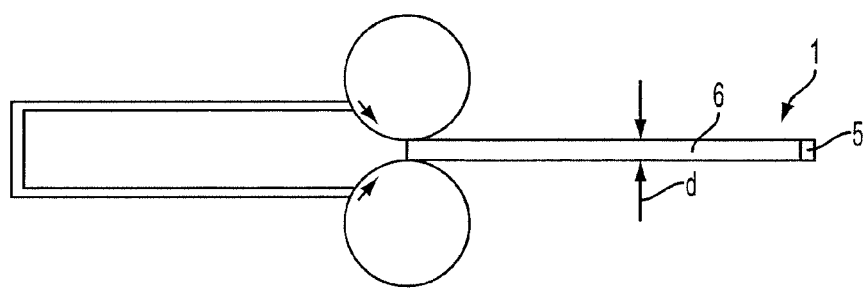
FIG. 2 is a schematic diagram of a side-view of the mechanical deformation and densification of the composite article of FIG. 1.
Figure 3:
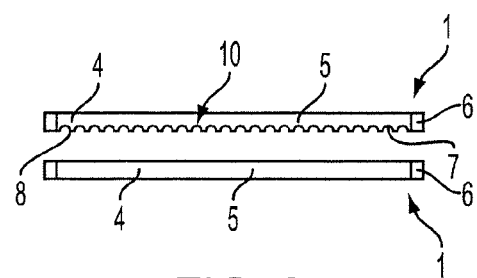
FIG. 3 is a schematic diagram showing the production of an embodiment of a spacer by profile rolling the composite article of FIG. 2.

FIGS. 1 to 3 illustrate the production of a composite article 1 comprising a single core 4 according to a first embodiment of the article and method described herein.

In this embodiment, illustrated in FIG. 1, a composite article 1 comprising one or more magnetocalorically active La(Fe, Si)$_{13}$-based phases is fabricated by providing an iron mantle 5 and a quantity of powder 4 comprising the magnetocalorically active La(Fe, Si)$_{13}$-based phase or phases.

The powder 4 is arranged in the iron mantle 5 so that the iron mantle or sheath 5 envelops and encloses the powder 4. The edges of the mantle 5 may be welded together to form a closed container so that the mantle 5 surrounds a core 6 of the magnetocalorically active powder 4.

In one embodiment, the powder 4 is provided as a pressed green body which has a degree of mechanical integrity. The green body is then enveloped in the mantle 5. In another embodiment, the powder is provided as a loose powder which is packed into the mantle, for example layer-by-layer.

The mantle may be provided in the form of a tube, open at one or two ends, or as a flat envelope open on one side or a mantle in the form of a foil may be wrapped around the precursor powder. A single longitudinal seam results which may be sealed by self welding of the mantle during a subsequent mechanical deformation process or may be sealed by welding or brazing.

In a particular embodiment, the mass ratio between the powder core 6 and the iron mantle 5 is preferably at least 4. It is advantageous that the fill factor of the composite article J. is as high as possible so as to increase the cooling power per unit volume of the composite article 1.

The article 1, after this stage in the process, is the active part of a magnetic heat exchange system.

In an embodiment, after the powder 4 is packed inside the iron mantle 5, the arrangement is subjected to a degassing treatment, which may be performed by placing the arrangement in a vacuum, before mechanical deformation of the article is carried out. The degassing heat treatment removes air and other volatile components which would otherwise be trapped inside the mantle 5.

In a further embodiment, the core 6 comprising the precursor powder 4 can then be densified, as illustrated in FIG. 2, by mechanically deforming the composite article 1.

Conventional mechanical deformation processes such as rolling, swaging and drawing may be used. If the initial composite has a plate-like structure, as illustrated in FIG. 1, rolling can be simply used. In another embodiment, the initial composite has a tubular structure, and drawing or swaging may be used, possibly followed by rolling if it is desired that the deformed composite article will have a plate-like or tape-like form. The manufacturing process may be considered as a type of powder-in-tube process for this embodiment.

In this particular embodiment, the mantle comprises copper, because the mantle is to be mechanically deformed, and copper is easily workable, ductile and has a high thermal conductivity to improve the thermal transfer from the magnetocalorically active core and the heat exchange medium of the magnetic heat exchanger.

The thickness of the composite article after the mechanical deformation process is on the order of one millimeter or less and the article 1 is provided in the form of a plate.

In further embodiments not illustrated in the figures, the mantle 5 comprises two or more layers of differing materials. This can be advantageous in that the inner mantle may be chemically compatible with the magnetocalorically active material or precursor thereof. This embodiment may be used if the article is to be subjected to a heat treatment. In this sense, the term "chemically compatible" is used to indicate that an undesired reaction does not occur between the material of the mantle 5 and the core 6 so as to move the stoichiometry of the magnetocalorically active material away from its desired stoichiometry. The outer mantle may be chemically incompatible with respect to the core but may provide mechanical stability or corrosion protection. The outer mantle may be provided in the form of a foil or tube similar to one of the embodiments already described. Alternatively, the outer mantle may be deposited as a coating on the mantle 5.

In further embodiments not illustrated in the figures, the composite article comprises a mantle and a plurality of cores. The plurality of cores may be provided by packing several composite articles together and enveloping them in a second outer mantle. This new multicore structure may then be subjected to further mechanical deformation steps before a reactive sintering heat treatment is carried out.

Alternatively, or in addition, a multicore structure could be provided initially by stacking together a plurality of precursor green bodies separated by metal alloy sheets. An outer mantle could be provided around this arrangement and the multicore structure mechanically deformed.

In a further embodiment, the powder 4 which is packed into the mantle 5 can be precursor powder 4 of the La(Fe, Si)$_{13}$-phase. The various components of the precursor powder are each provided in amount to provide the stoichiometry for the desired La(Fe, Si)$_{13}$-based phase. In this particular embodiment, the precursor powder contains no substantial amount of a magnetocalorically active La(Fe, Si)$_{13}$-based phase.

The composite article is heat treated and the precursor powder of the core reactive sintered to produce a magnetocalorically active core comprising a La(Fe,Si)$_{13}$-based phase enveloped by the mantle. This heat treatment may be carried out after the mechanical deformation process, if such a process is performed.

If a precursor powder is enveloped in the mantle 5, suitable materials for the mantle may be steel, stainless steel, nickel alloys or iron silicon. Stainless steel and nickel alloys have the advantage that they are corrosion resistant and can provide an protective outer coating for both the precursor powder as well as the reacted La(Fe, Si)$_{13}$-based phase. If the mantle is to be subjected to a heat treatment, the material of the mantle should be chemically and physically stable at the temperatures and under the conditions to which it is to be subjected. These materials may also be used if the powder 4 packed into the mantle is already fully reacted.

The composite article 1 may be provided in a form suitable for use as the active component in a magnetic refrigeration system or may be used in combination with further magnetocalorically active composite articles to form laminated articles or composite articles of a more complex shape.

If two or more composite articles are provided, each article may comprise a different $T_c$ which may be provided by adjusting the composition of the La(Fe, Si)$_{13}$ phase by adjusting the stoichiometry of the precursor powder mixture as previously described.

The composite article comprising a mantle and one or more cores may be further worked to provide a component having the desired form for heat exchanger if the as manufactured composite is not appropriate.

For example, if a long-length tape or wire is produced, this may be wound into a coil or spool. The coil may have the form of a solenoid coil which may be multilayered or the core may be provided in the form of a flat pancake coil. Several of these pancake coils may be stacked together to provide a cylindrical component.

Alternatively, the tape or wire may be wound around a former of the desired shape, example a square, rectangular or hexagonal former.

If plates or plate-like forms are produced, these may be stacked one on top of the other to provide a laminate structure of the desired lateral size and thickness. In all cases, the different layers may be welded or soldered together. The desired lateral form may be provided by stamping the desired shape out of a composite article in the from of a plate or foil.

If, however, the assembled article is not subjected to further heat treatment, a glue having the appropriate thermal stability for the application may be used. Since the Curie temperature of these materials and consequently, the operating temperature of these materials, is around room temperature, conventional glues or resins could be used.

In a further embodiment, illustrated in FIG. 3, the surface area of the composite article comprising a mantle 5 and one or more cores is increased by providing one or more channels 7 in one or more surfaces. This can be easily and simply achieved by profile rolling.

The profile rolling may be carried out so that one surface of the composite article comprises a plurality of generally parallel grooves 7 separated by a plurality of generally parallel ridges 8.

In the case of a core initially comprising precursor powder, the profile rolling may be carried out before or after the reactive sintering process to form the magnetocalorically active phase.

The channel 7 or channels are adapted so as to direct the flow of the heat exchange medium or working fluid when the composite article is mounted in the heat exchanger. This can reduce the flow resistance of the heat exchange medium and improve the efficiency of the heat exchanger.

Figure 4:
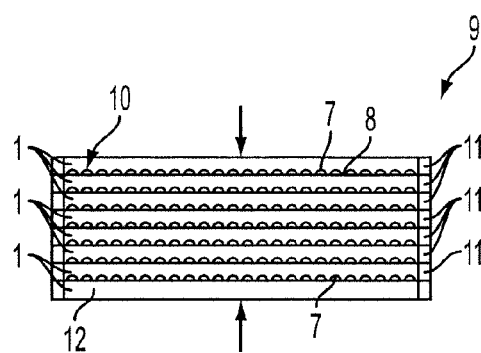
FIG. 4 is a schematic diagram of the assembly of an embodiment of a laminate article comprising a plurality of the composite articles illustrated in FIG. 3.
Figure 5:
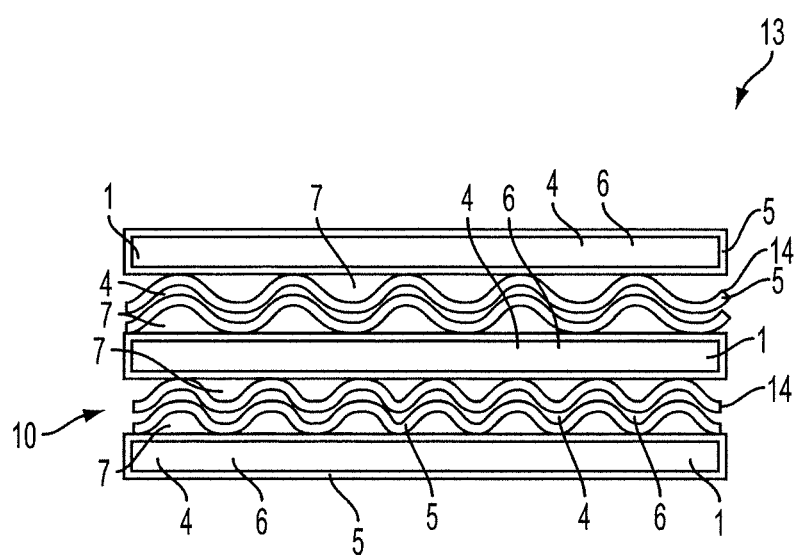
FIG. 5 is a schematic diagram showing a side view of a laminated article according to a second embodiment of the laminated article described herein in which the spacer is provided as an additional member.

In further embodiments of the invention, illustrated in FIGS. 4 and 5, a laminated article 9 which comprises two or more composite articles 1, each comprising a mantle 5 and one or more cores 6 is provided.

FIG. 4 illustrates the assembly of a laminate article 9, according to a first embodiment, which comprises a plurality of the composite articles 1 illustrated in FIG. 3.

In the embodiment illustrated in FIG. 4, the laminated article 9 comprises, at least one spacer 10 is provided which is positioned between adjacent layers 11 of the laminated article 9. The spacer 10 provides gaps in the laminated article 9 through which the heat exchange medium can flow thus increasing the contact area between the heat exchange medium and the laminated article 9 and improving the heat transfer. The spacer 10 is provided in a form adapted to provide a series of channels 7 through which the heat exchange medium can flow. These channels 7 are generally parallel to one another and may be further adapted to direct the flow of the heat exchange medium so as to reduce flow resistance when the laminated article is in use as part of a magnetic heat exchanger.

In the first embodiment, illustrated in FIG. 4, the spacer 10 is provided as an integral part of the composite article 1 since the channels 7 are provided by the grooves 7 formed in a surface of the articles 1.

In the embodiment illustrated in FIG. 4, the laminate 9 comprises seven layers 11 of the composite article 1, each comprising a plurality of generally parallel grooves 7 produced by profile rolling in one surface. These composite articles 1 are stacked with the side comprising the grooves 7 facing towards a base plate 12 which is free from grooves. The base plate 12 is also a composite article 1 comprising a mantel 5 and core 6 comprising a La(Fe, Si)$_{13}$-based phase. Thus, a spacer 10 in the form of a plurality of channels 7 is provided between adjacent layers 11 of the laminate structure 9.

In further embodiment, the laminated article 9 is stacked so that the grooves 7 of one layer 11 are positioned orthogonally to the grooves 7 of the adjacent layer 11 and so on through the stack. This provides a fin of the heat exchanger with a cross type arrangement. One direction may be used as the inflow and the other direction as the outflow.

In a second embodiment of a laminated article 13, illustrated in FIG. 5, the spacer 10 is provided in the form of an additional element positioned between adjacent composite articles I of the laminated structure 9.

The spacer 10 is provided by a corrugated tape 14. The laminated article 13, therefore, comprises alternating layers of a flat composite article 1 and a corrugated tape 14 as is commonly known in the structure of corrugated cardboard. The corrugated tape 14 provides channels 7 which are adapted to direct the flow of the heat exchange medium. In the embodiment illustrated in FIG. 5, the laminated article 13 comprises two spacers 10 in the form of corrugated tapes 14 and three flat composite articles 1. however, any number of layers may be provided. In a particular embodiment, the outermost layers of the stack may also comprise corrugated tapes 14.

In the embodiment illustrated in FIG. 5, the corrugated tape 14 comprises at least one magnetocalorically active La(Fe, Si)$_{13}$-based phase. In other words, the spacer 10 in the form of a corrugated tape 14 may be provided by a corrugated composite article 1 comprising a mantle 5 and at least one core 6 according to one of the embodiments previously described. This embodiment has the advantage that the laminate structure 13 is strong and the thickness of the tape 14 providing the corrugated spacer 10 and the flat tapes 1 may be varied depending on the cross-sectional area and size of the channels 7 desired.

The use of an additional spacer 10 has the advantage that it can be more simply integrated into a coil type structure by co-winding a flat tape and corrugated tape. A co-wound pancake coil or solenoid coil can also be fabricated in a similar way.

The corrugated tape 14 may be fabricated by rolling the tape, or composite article 1 in tape form, between two meshed cogs for example.

In Further embodiments not illustrated in the Figures, the spacer may be provided as a former. The former may be a series of posts or rods positioned between adjacent layers 11. Alternatively, if a long-length tape or wire is provided, the former may be provided in the form of a wheel having a plurality of perpendicularly arranged pins arranged at intervals from the centre to the periphery of the wheel around which the tape or wire may be wound.

In the case of precursor powder being initially packed in the mantle 5, the laminate structure 9 or 13 may also be assembled before a heat treatment is carried out. The heat treatment to form the magnetocalorically active phase is then carried out on the laminated article. The laminated article may be kept under mechanical pressure during the heat treatment.

The invention having been described by reference to certain specific embodiments thereof, it will be understood that these embodiments are illustrative, and do not limit the appended claims.

The invention claimed is:

1. An article comprising:
    at least one core, comprising a plurality of reactively sintered grains comprising a magnetocalorically active material; and
    a mantle enveloping said at least one core.

2. The article according to claim 1, wherein the magnetocalorically active material has a Curie temperature in the range of 220K to 345K.

3. The article according to claim 1, wherein the magnetocalorically active material is one of Gd, a $La(Fe_{1-b}Sub_b)_{13}$-based phase, a $Gd_5(Si, Ge)_4$-based phase, a Mn(As, Sb)-based phase, a MnFe(P, As)-based phase, a Tb—Gd-based phase, a (Pr, Nd, Sr) $MnO_3$-based phase or a $Pr_e(Fe, Co)_{17}$-based phase.

4. The article according to claim 1, wherein adjacent grains of the plurality of grains are contiguous.

5. The article according to claim 1, wherein said at least one core comprises a plurality of cores enveloped by the mantle.

6. The article according to claim 5, further comprising a matrix in which the plurality of cores are embedded.

7. The article according to claim 6, wherein the matrix and the mantle comprise the same materials.

8. The article according to claim 6, wherein the matrix and the mantle comprise different materials.

9. The article according to claim 1, where the mantle is plastically deformable.

10. The article according to claim 1, where the mantle comprises two layers.

11. The article according to claim 1, wherein the mantle comprises copper or a copper alloy or aluminium or an aluminium-based alloy.

12. The article according to claim 1, wherein the article is elongate.

13. The article according to claim 12, wherein the article is in the form of a tape or a wire or a plate.

14. An article comprising:
    at least one core, comprising a plurality of reactively sintered grains comprising a magnetocalorically active material; and
    a mantle enveloping said at least one core, wherein the article is in the form of a solenoid coil, or is in the form of one or more pancake coils.

15. The article according to claim 14, wherein the article is wound in the form of a solenoid coil.

16. The article according to claim 14, wherein the article is wound in the form of a pancake coil.

17. The article according to claim 16, wherein the article further comprises a plurality of pancake wound coils.

18. The article according to claim 17, wherein each coil comprises a magnetocalorically active material having a different $T_c$.

* * * * *